United States Patent
Uehara et al.

(10) Patent No.: US 10,767,057 B2
(45) Date of Patent: Sep. 8, 2020

(54) COATING FILM, COMPOSITION FOR COATING FILM, FILM-FORMING AGENT, ARTICLE HAVING COATING FILM, AND METHOD FOR FORMING COATING FILM

(71) Applicants: DAIKIN INDUSTRIES, LTD., Osaka-shi, Osaka (JP); OTSUKA PACKAGING INDUSTRIES CO., LTD., Naruto-shi, Tokushima (JP); OTSUKA PHARMACEUTICAL FACTORY, INC., Naruto-shi, Tokushima (JP)

(72) Inventors: Tetsuya Uehara, Osaka (JP); Eiji Masuda, Osaka (JP); Kenta Shimada, Naruto (JP); Daichi Shibazaki, Naruto (JP); Fujio Inoue, Naruto (JP)

(73) Assignees: DAIKIN INDUSTRIES, LTD., Osaka-shi, Osaka (JP); OTSUKA PACKAGING INDUSTRIES CO., LTD., Naruto-shi, Tokushima (JP); OTSUKA PHARMACEUTICAL FACTORY, INC., Naruto-shi, Tokushima (JP)

( * ) Notice: Subject to any disclaimer, the term of this patent is extended or adjusted under 35 U.S.C. 154(b) by 12 days.

(21) Appl. No.: 16/092,799

(22) PCT Filed: Feb. 24, 2017

(86) PCT No.: PCT/JP2017/007251
§ 371 (c)(1),
(2) Date: Oct. 11, 2018

(87) PCT Pub. No.: WO2017/179316
PCT Pub. Date: Oct. 19, 2017

(65) Prior Publication Data
US 2019/0085172 A1    Mar. 21, 2019

(30) Foreign Application Priority Data

Apr. 12, 2016   (JP) .................................. 2016-079598

(51) Int. Cl.
| | | |
|---|---|---|
| *B32B 27/30* | (2006.01) | |
| *B05D 7/24* | (2006.01) | |
| *B65D 65/42* | (2006.01) | |
| *C09D 5/00* | (2006.01) | |
| *C09D 7/40* | (2018.01) | |
| *C09D 133/18* | (2006.01) | |
| *C09D 133/16* | (2006.01) | |
| *C09D 129/04* | (2006.01) | |

(52) U.S. Cl.
CPC ............... *C09D 5/00* (2013.01); *B05D 7/24* (2013.01); *B32B 27/30* (2013.01); *B65D 65/42* (2013.01); *C09D 7/40* (2018.01); *C09D 7/68* (2018.01); *C09D 7/69* (2018.01); *C09D 129/04* (2013.01); *C09D 133/16* (2013.01); *C09D 133/18* (2013.01)

(58) Field of Classification Search
None
See application file for complete search history.

(56) References Cited

U.S. PATENT DOCUMENTS

| | | | |
|---|---|---|---|
| 2009/0325849 A1 | 12/2009 | Gotz et al. | |
| 2014/0024761 A1* | 1/2014 | Kasahara | C08K 3/26 524/425 |
| 2014/0373757 A1 | 12/2014 | Schoelkopf et al. | |
| 2015/0094410 A1 | 4/2015 | Martin et al. | |
| 2015/0132550 A1* | 5/2015 | Kohno | G02B 5/206 428/212 |
| 2015/0247079 A1 | 9/2015 | Nishikawa et al. | |
| 2018/0016466 A1 | 1/2018 | Schoelkopf et al. | |
| 2018/0148581 A1 | 5/2018 | Martin et al. | |
| 2019/0309189 A1 | 10/2019 | Schoelkopf et al. | |

FOREIGN PATENT DOCUMENTS

| | | |
|---|---|---|
| CN | 103857715 A | 6/2014 |
| EP | 2 762 504 A1 | 8/2014 |
| JP | 50-94293 A | 7/1975 |
| JP | 54-069584 A | 6/1979 |
| JP | 58-87196 A | 5/1983 |
| JP | 6-041520 A | 2/1994 |
| JP | 7-268245 A | 10/1995 |
| JP | 8-209590 A | 8/1996 |
| JP | 10-287867 A | 10/1998 |
| JP | 2012-219220 A | 11/2012 |
| JP | 5242841 B1 | 7/2013 |
| JP | 2014-000697 A | 1/2014 |
| WO | 2008022985 A1 | 2/2008 |
| WO | 2013117511 A1 | 8/2013 |
| WO | 2015/048797 A1 | 4/2015 |

OTHER PUBLICATIONS

International Search Report for PCT/JP2017/007251 dated Apr. 4, 2017 [PCT/ISA/210].
Communication dated Nov. 15, 2019 from the European Patent Office in application No. 17782134.5.
Office Action dated May 20, 2020 in Chinese Application No. 201780023008.1.

* cited by examiner

*Primary Examiner* — Sheeba Ahmed
(74) *Attorney, Agent, or Firm* — Sughrue Mion, PLLC

(57) ABSTRACT

A coating film exhibiting excellent water and oil repellency is provided. The coating film comprises (a) calcium carbonate having an average particle diameter of 600-9,000 nm, (b) poly(vinyl alcohol), and (c) a copolymer including constituent units of a monomer having a C6 or lower perfluoroalkyl group.

15 Claims, No Drawings

COATING FILM, COMPOSITION FOR COATING FILM, FILM-FORMING AGENT, ARTICLE HAVING COATING FILM, AND METHOD FOR FORMING COATING FILM

CROSS REFERENCE TO RELATED APPLICATIONS

This application is a National Stage of International Application No. PCT/JP2017/007251, filed on Feb. 24, 2017, which claims priority from Japanese Patent Application No. 2016-079598, filed on Apr. 12, 2016.

TECHNICAL FIELD

The present invention relates to a coating film, a composition for the coating film, a film-forming agent, an article having the coating film, and a method for forming the coating film. More specifically, the present invention relates to a coating film having excellent water and oil repellency, a composition for the coating film, a film-forming agent, an article having the coating film, and a method for forming the coating film.

BACKGROUND ART

Conventionally, packaging materials such as food containers have been required to be provided with water and oil repellency. As a method for imparting water and oil repellency to a surface of an object, for example, there is known a method by which a surface of an object is provided with irregularities using particulates of metal oxide or the like d further coated with a water- and oil-repellent material like a fluoropolymer.

For example, Patent Document 1 discloses a method in which metal oxide particulates coated with a specific fluororesin are used; Patent Document 2 discloses a method in which a composition composed of a binder such as a silicone resin, particulates of silica or the like, and a water- and oil-repellent compound such as a fluorine-containing compound is used; Patent Document 3 discloses a method in which a dispersion of a silica having a specific particle diameter in a fluororesin is used; and Patent Document 4 discloses a method in which a composition composed of an aggregate and a fluororesin or the like is used.

On the other hand, methods are known in which when a surface of an article made of, for example, paper or fiber is coated with a water- and oil-repellent material such as a fluoropolymer, a water-soluble polymer such as polyvinyl alcohol, polyacrylamide, and starch is used in combination therewith, in order to strengthen the coating (see, for example, Patent Documents 5 to 7).

PRIOR ART DOCUMENTS

Patent Documents

Patent Document 1: Japanese Patent No. 5242841
Patent Document 2: Japanese Patent Laid-open Publication No. 2014-697
Patent Document 3: Japanese Patent Laid-open Publication Hei 10-287867
Patent Document 4: Japanese Patent Laid-open Publication Hei 7-268245
Patent Document 5: Japanese Patent Laid-open Publication Sho 50-94293
Patent Document 6: Japanese Patent Laid-open Publication Hei 8-209590
Patent Document 7: Japanese Patent Laid-open Publication No. 2012-219220

SUMMARY OF THE INVENTION

Problems to be Solved by the Invention

However, the above-mentioned conventional methods cannot achieve both water and oil-repellent effects to a sufficient degree, and for example, poses a problem of causing insufficient water- and oil-repellent effects with respect to foods and the like having high viscosity.

Under such circumstances, the present invention mainly aims at providing a coating film exhibiting excellent water and oil repellency, a composition for coating film or film-forming agent allowing the formation of such a coating film, an article having such a coating film, and a method for forming such a coating film.

Means for Solving the Problem

The present inventors have conducted intensive studies to solve the above-mentioned problem. As a result, the present inventors have found that a coating film comprising (a) calcium carbonate having an average particle diameter of 600 nm to 9000 nm, (b) a polyvinyl alcohol, and (c) a copolymer comprising, as a constituent unit, a monomer having a perfluoroalkyl group of not more than 6 carbon atoms exhibits excellent water and oil repellency, and also presents excellent water- and oil-repellent effects, for example, with respect to foods and the like having high viscosity. Based on these findings, further investigations have been made, thereby leading to the completion of the present invention.

Thus, the present invention provides inventions according to the embodiments which follows:

Item 1. A coating film comprising:
 (a) calcium carbonate having an average particle diameter of 600 nm to 9000 nm.
 (b) a polyvinyl alcohol, and
 (c) a copolymer comprising, as a constituent, a monomer having a perfluoroalkyl group of not more than 6 carbon atoms.
Item 2. The coating film according to item 1, wherein a degree of saponification of (b) the polyvinyl alcohol is 97 mol % or more.
Item 3. The coating film according to Item 1 or 2, wherein (a) the calcium carbonate having an average particle diameter of 600 nm to 9000 nm is at least one of porous calcium carbonate and aggregated calcium carbonate,
Item 4. The coating film according to any of Items 1 to 3, comprising:
 a first layer comprising (a) the calcium carbonate having an average particle diameter of 600 to 9000 nm and (b) the polyvinyl alcohol, and
 a second layer comprising (c) the copolymer comprising, as a constituent unit, the monomer having the perfluoroalkyl group of not more than 6 carbon atoms.
Item 5. A composition for coating film, comprising:
 (a) calcium carbonate having an average particle diameter of 600 to 9000 nm,
 (b) a polyvinyl alcohol, and
 (c) a copolymer comprising, as a constituent unit, a monomer having a perfluoroalkyl group of not more than 6 carbon atoms.

Item 6. The composition for coating film according to item 5, wherein a degree of saponification of (b) the polyvinyl alcohol is 97 mol % or more.

Item 7. The composition for coating film according to Item 5 or 6, wherein (a) the calcium carbonate having an average particle diameter of 600 nm to 9000 nm is at least one of porous calcium carbonate and aggregated calcium carbonate.

Item 8. The composition for coating film according to any of Items 5 to 7, wherein a content of (a) the calcium carbonate having an average particle diameter of 600 nm to 9000 nm is 5% to 30% by mass, a content of (b) the polyvinyl alcohol is 0.1% to 15% by mass, and a content of (c) the copolymer comprising, as a constituent unit, the monomer having the perfluoroalkyl group of not more than 6 carbon atoms is 0.2% to 20% by mass; and wherein the composition is an aqueous dispersion.

Item 9. A film-forming agent comprising:

a first agent comprising (a) calcium carbonate having an average particle diameter of 600 nm to 9000 run, and (b) a polyvinyl alcohol, and a second agent comprising (c) a copolymer comprising, as a constituent unit, a monomer having a perfluoroalkyl group of not more than 6 carbon atoms.

Item 10. An article having the coating film according to any of Items 1 to 4 on at least a portion of a surface of the article.

Item 11. The article according to item 10, wherein the surface is formed of paper, plastic, glass, or metal.

Item 12. The article according to item 10 or 11, wherein the article is a packaging material.

Item 13. A paper container having the coating film according to any of Items 1 to 4 on the inner surface of the paper container.

Item 14. A method for forming the coating film according to Item 4 on a surface of an article, comprising:

a step 1 of applying, onto the surface of the article, a first agent comprising (a) the calcium carbonate having an average particle diameter of 600 nm to 9000 run and (b) the polyvinyl alcohol, followed by drying to form a first layer, and a step 2 of applying, onto the first layer, a second agent comprising (c) the copolymer comprising, as a constituent unit, the monomer having the perfluoroalkyl group of not more than 6 carbon atoms, followed by drying to form a second layer.

Item 15. A method of forming a coating film on a surface of an article, comprising:

applying the composition for coating film according to any of Items 5 to 8 on the surface of the article, followed by drying.

Advantages of the Invention

According to the present invention, it is possible to provide a coating film exhibiting excellent water and oil repellency. Furthermore, according to the present invention, it is also possible to provide a composition for coating film or film-forming agent allowing the formation of such a coating film, an article having such a coating film, and a method for forming of such a coating film.

EMBODIMENTS OF THE INVENTION

1. Coating Films

A coating film of the present invention is characterized in that it comprises (a) calcium carbonate having an average particle diameter of 600 nm to 9000 nm, (b) a polyvinyl alcohol, and (c) a copolymer comprising, as a constituent unit, a monomer having a perfluoroalkyl group of not more than 6 carbon atoms. The coating film, which comprises these components (a), (b), and (c), can exhibit excellent water and oil repellency. In the present invention, "(a) calcium carbonate having an average particle diameter of 600 nm to 9000 nm" may be referred to as a "component (a)," "(b) a polyvinyl alcohol" as "component (b)," and "(c) a copolymer comprising, as a constituent unit, a monomer having a perfluoroalkyl group of not more than 6 carbon atoms" as a "component (c)."

A coating film of the present invention includes (a) the calcium carbonate having an average particle diameter of 600 nm to 9000 nm that is contained in a coating film, the calcium carbonate is not particularly limited, and commercially available products can also be used as the calcium carbonate. In the coating film, the average particle diameter of the calcium carbonate contained therein falls within this specific range, thereby making it possible that it exhibits excellent water and oil repellency.

The type of calcium carbonate is not particularly limited; from the viewpoint that the coating film exhibits excellent water and oil repellency, preference is given to at least one of porous calcium carbonate and aggregated calcium carbonate, in particular that having a BET specific surface area (a specific surface area determined by a gas adsorption method) of 10 $m^2/g$ to 40 $m^2/g$. Whether or not the calcium carbonate is an aggregated calcium carbonate in which calcium carbonate particles are aggregated depends on the shape, diameter, uniformity, presence or absence of surface treatment, etc. of primary particles. Here, the average particle diameter of calcium carbonate is a median diameter (D50) that is determined by a laser diffraction method, and refers to a median diameter of primary particles when calcium carbonate particles exist as primary particles or of aggregated particles when calcium carbonate particles are aggregated. The BET specific surface area is a value determined by the BET method, that is, a value determined from the amount of adsorption of nitrogen gas molecules of which the adsorption occupied area is known.

By way of example, a more preferable range of the average particle diameter of the component (a) can be 1000 nm to 8000 nm, and a particularly preferable range can be 3000 nm to 7000 nm. In cases of aggregated calcium carbonate, it preferably has a primary particle diameter that is not too small, and suitably has a primary particle diameter of 160 nm or more. Here, the primary particle diameter can be approximately determined from the above-described BET specific surface area by the calculation formula: primary particle diameter=6/(density×BET specific surface area).

The content of the calcium carbonate (a) having an average particle diameter of 600 nm to 9000 nm, in the coating film is not particularly limited, and is preferably of the order of 30% to 80% by mass, more preferably of the order of 35% to about 75% by mass, from the viewpoint of exhibiting excellent water and oil repellency.

The polyvinyl alcohol (b) that is contained in the coating film is not particularly limited, and known polyvinyl alcohols can be used as the polyvinyl alcohol. Since the coating film exhibits excellent water and oil repellency and at the same time is superior in durability, (b) the polyvinyl alcohol preferably is a saponified polyvinyl acetate. From the viewpoint as described above, the degree of saponification of the (b) polyvinyl alcohol preferably is 97 mol % or more. As (b) the polyvinyl alcohol, use can be made of commercially available products.

From the viewpoint that the coating film exhibits excellent water and oil repellency, the degree of polymerization of (b) the polyvinyl alcohol is preferably of the order of 100 to 2500, more preferably of the order of 250 to 2000.

The content of (b) the polyvinyl alcohol in the coating film is not particularly limited, and is preferably of the order of 0.1% to 35% by mass, more preferably of the order of 0.3% to 25% by mass, from the viewpoint of exhibiting excellent water and oil repellency.

The component (c) is a copolymer comprising, as a constituent unit, a monomer having a perfluoroalkyl group having not more than 6 carbon atoms. In the component (c), the monomer having the perfluoroalkyl group of not more than 6 carbon atoms may comprise a monomer of one type, or monomers of two or more types.

From the viewpoint that the coating film exhibits excellent water and oil repellency, the component (c) preferably is an anionic copolymer.

The monomer having a perfluoroalkyl group of not more than 6 carbon atoms that is a constituent unit of the copolymer is not particularly limited, as long as it is a monomer having a linear or branched perfluoroalkyl group containing 1 to 6 carbon atoms. A specific example of the monomer having a perfluoroalkyl group of not more than 6 carbon atoms preferably is a fluorine-containing (meth)acrylate monomer represented by the general formula (c1) described below. In the present invention, by "(meth)acrylate" is meant an "acrylate or methacrylate," and this applies to expressions similar thereto.

[Chem 1]

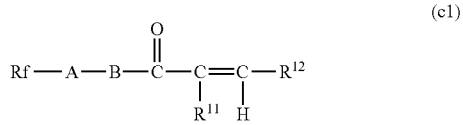

(c1)

In the general formula (c1) described above, the Rf group represents a linear or branched perfluoroalkyl group containing 1 to 6 carbon atoms. The A group represents an aliphatic group of 1 to 10 carbon atoms, an aromatic group or a cycloaliphatic group of 6 to 10 carbon atoms, a $-SO_2N(R^1)CH_2CH_2-$ group, wherein $R^1$ is an alkyl of 1 to 4 carbon atoms, or a $-CH_2CH(OZ^1)CH_2-$ group, wherein $Z^1$ is a hydrogen atom or an acetyl group, or a $-(CH_2)m-SO_2-(CH_2)n-$ group or a $-(CH_2)m-S-(CH_2)n-$ group, wherein m is 0 to 10 and n is 1 to 10. The B group represents $-O-$ or $-NH-$. One of $R^{11}$ and $R^{12}$ represents a hydrogen atom, and the other represents a hydrogen atom, an alkyl group containing 1 to 4 carbon atoms, a halogen atom, a $CFX^1X^2$ group, wherein $X^1$ and $X^2$ are each independently a hydrogen atom, a fluorine atom, or a chlorine atom, a cyano group, a linear or branched fluoroalkyl group containing 1 to 20 carbon atoms, a substituted or unsubstituted benzyl group, or a substituted or unsubstituted phenyl group.

In the general formula (c1), the Rf group is a perfluoro group in which all the hydrogen atoms of the alkyl group are replaced by fluorine atoms. The Rf group may be of a linear chain structure, or of a branched structure. The number of carbon atoms in the Rf group is preferably 2 to 6, more preferably 4 to 6.

Specific examples of the Rf group include, for example, $-CF_3$, $-CF_2CF_3$, $-CF_2CF_2CF_3$, $-CF(CF_3)_2$, $-CF_7CF_2CF_2CF_3$, $-CF_2CF(CF_3)_2$, $-C(CF_3)_3$, $-(CF_2)_4CF_3$, $-(CF_2)_2CF(CF_3)_2$, $-CF_2C(CF_3)_3$, $-CF(CF_3)CF_2CF_2CF_3$, $-(CF_2)_5CF_3$, and $-(CF_2)_3CF(CF_3)_2$. Among these, $-(CF_2)_5CF_3$ is particularly preferable.

When $R^{11}$ or $R^{12}$ is a halogen atom, the halogen atom preferably includes a fluorine atom, a chlorine atom, a bromine atom, and a iodine atom.

Fluorine-containing (meth)acrylate monomers represented by the general formula (c1) preferably include compounds represented by the following formulae: $CH_2=CR'COO(CH_2)_2Rf$, $CH_2=CR'COOC_6H_4Rf$, $CH_2=CR'COO(CH_2)_2N(CH_3)SO_2Rf$, $CH_2=CR'COO(CH_2)_2N(C_2H_5)SO_2Rf$, $CH_2=CR'COOCH_2CH(OH)CH_2Rf$, $CH_2=CR'COOCH_2CH(OCOCH_3)CH_2Rf$, $CH_2=CR'COO(CH_2)_2Rf$, $CH_2=CR'COO(CH_2)_2S(CH_2)_2Rf$, $CH_2=CR'COO(CH_2)_3SO_2Rf$, $CH_2=CR'COO(CH_2)_2SO_2(CH_2)_2Rf$, and $CH_2=CR'CONH(CH_2)_2Rf$.

In each of these formulae, R' represents a hydrogen atom, an alkyl group containing 1 to 4 carbon atoms, a halogen atom, a $CFX^1X^2$ group, wherein $X^1$ and $X^2$ each independently represent a hydrogen atom, a fluorine atom, or a chlorine atom, a cyano group, a linear or branched fluoroalkyl group containing 1 to 20 carbon atoms, a substituted or unsubstituted benzyl group, or a substituted or unsubstituted phenyl group, especially a hydrogen atom, a halogen atom, or a methyl group. The Rf group is the same as in the above-described general formula (c1).

In addition, it is preferable that in these formulas, the A group does not contain S (a sulfur atom) or N (a nitrogen atom). More preferably, the A group is an alkylene group. For example, a methylene group, an ethylene group, a propylene group, and others are particularly preferable.

Particularly preferable specific examples of fluorine-containing (meth)acrylate monomers represented by general formula (c1) include compounds represented by the following formulae: $F(CF_2)_5CH_2CH_2OCOCR'=CH_2$, $F(CF_2)_4CH_2CH_2OCOCR'=CH_2$, $F(CF_2)_6CH_2CH_2OCOCR'=CH_2$, $H(CF_2)_6CH_2CH_2OCOCR'=CH_2$, $H(CF_2)_4CH_2CH_2OCOCR'=CH_2$, $F(CF_2)_2CH_2OCOCR'=CH_2$, $(CF_3)_2CFCH_2CH_2OCOCR(CF_3)_2CF(CF_2)_3CH_2CH_2OCOCR'=CH_2$, $F(CF_2)_6SO_2CH_2CH_2CH_2OCOCR'=CH_2$, $F(CF_2)_4SO_2CH_2CH_2CH_2OCOCR'=CH_2$, $F(CF_2)_6SCH_2CH_2OCOCR'=CH_2$, $F(CF_2)_4SCH_2CH_2OCOCR'=CH_2$, $F(CF_2)_6CH_2CH_2SCH_2CH_2OCOCR'=CH_2$, $F(CF_2)_4CH_2CH_2SCH_2CH_2OCOCR'=CH_2$, $F(CF_2)_6CH_2CH_2SO_2CH_2CH_2OCOCR'=CH_2$, $F(CF_2)_4CH_2CH_2SO_2CH_2CH_2OCOCR'=CH_2$, $F(CF_2)_6CH_2CH_2NHCOCR'=CH_2$, and $F(CF_2)_4CF_2CH_2NHCOCR'=CH_2$. In each of these formulae. R' represents a hydrogen atom, a halogen atom, or a methyl group.

In the component (c), the proportion of the moiety that is comprised of a monomer having a perfluoroalkyl group of not more than 6 carbon atoms is not particularly limited, and is preferably of the order of 55 parts to 99 parts by mass, more preferably of the order of 60 parts to 95 parts by mass, further preferably of the order of 65 parts to 90 parts by mass, on the basis of 100 parts by mass of the entire component (c).

In the component (c), a second monomer that undergoes copolymerization with a monomer having a perfluoroalkyl group of not more than 6 carbon atoms is not particularly limited, as long as it is a monomer capable of copolymerization with the monomer having the perfluoroalkyl group of not more than 6 carbon atoms; the second monomer preferably comprises at least one of a monomer containing a cationic donor group, a monomer containing an anionic donor group, and a monomer containing an oxyalkylene group.

Specific examples of a monomer containing a cationic donor group include nitrogen-containing monomers represented by the general formulae (c2-1-1) to (c2-1-3) described below, and may preferably be selected from the group consisting of dimethylaminoethyl methacrylate, dimethylaminopropyl methacrylate, diethylaminoethyl methacrylate, diethylaminopropyl methacrylate, N-tert-butylaminoethyl methacrylate, dimethylaminoethyl acrylate, dimethylaminopropyl acrylate, diethylaminoethyl acrylate, diethylaminopropyl acrylate, or N-tert-butylaminoethyl acrylate, or salts or N-oxides thereof. The anionic donor group may be a carboxyl group, or a sulfonic acid group. The monomer containing an anionic donor group may preferably be selected from the group consisting of (meth)acrylic acid, crotonic acid, maleic acid, fumaric acid, itaconic acid, citraconic acid, vinylsulfonic acid, (meth)allylsulfonic acid, styrenesulfonic acid, vinylbenzenesulfonic acid, acrylamide-tert-butylsulfonic acid, salts thereof.

[Chem 2]

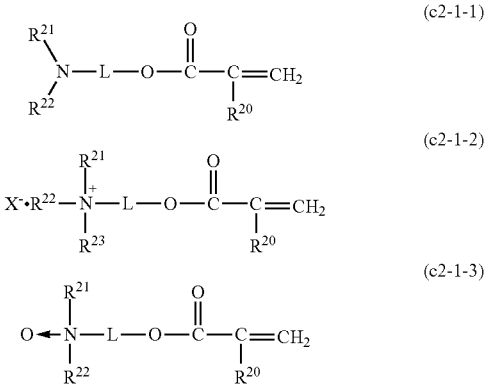

In each of the general formulae (c2-1-1) to (c2-1-3), L represents a linear or branched alkylene group containing 1 to 4 carbon atoms, and $R^{20}$ represents a hydrogen atom or a methyl group. $R^{21}$, $R^{22}$, and $R^{23}$ are the same or different and are a hydrogen atom, a linear or branched alkyl group containing 1 to 18 carbon atoms, or a hydroxyethyl group, or a benzyl group, or alternatively $R^{21}$ and $R^{22}$ are combined together to represent a divalent organic group containing 2 to 30 carbon atoms, and $X^-$ represents an anion group.

The monomer containing an oxyalkylene group is represented by the general formula (c2-2-1) or c2-2-2) described below, and may preferably be selected from the group consisting of 2-hydroxyethyl (meth)acrylate, ω-hydroxy-polyoxyethylene (meth)acrylate, wherein the average degree of polymerization (n) in the polyoxyethylene group is 2 to 10, polyoxyethylene di(meth)acrylate, wherein the average degree of polymerization (n) in the polyoxyethylene group is 2 to 14, 2-hydroxypropyl (meth)acrylate, 4-hydroxybutyl (meth)acrylate, methyl (meth)acrylate, and n-butyl (meth) acrylate. The monomer containing a cationic donor group, the monomer containing an anionic, donor group, and the monomer containing an oxyalkylene group may each comprise a monomer of one type, or monomers of two or more types.

[Chem 3]

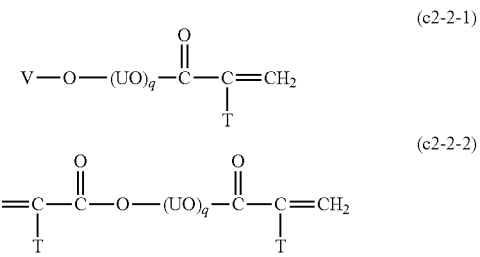

In each of the general formulae (c2-2-1) and (c2-2-2). T represents a hydrogen atom or a methyl group, U represents an alkylene group of 2 to 6 carbon atoms, V represents a hydrogen atom, or an unsaturated or saturated hydrocarbon group of 1 to 22 carbon atoms, and q represents an integer of 1 to 90.

In the component (c), when the second monomer contains a cationic donor group, the proportion of the moiety that is comprised of the monomer containing a cationic donor group is not particularly limited, and is preferably of the order of 0 parts to 45 parts by mass, more preferably of the order of 1 part to 30 parts by mass, further preferably of the order of 5 parts to 20 parts by mass, on the basis of 100 parts by mass of the entire component (c). When the second monomer contains an anionic donor group, the proportion of the moiety that is comprised of the monomer containing an anionic donor group is not particularly limited, and is preferably of the order of 0 parts to 45 parts by mass, more preferably of the order of 1 part to 30 parts by mass, further preferably of the order of 5 parts to 20 parts by mass, on the basis of 100 parts by mass of the entire component (c). When the second monomer contains an oxyalkylene donor group, the proportion of the moiety that is comprised of the monomer containing an oxyalkylene group is not particularly limited, and is preferably of the order of 0 parts to about 45 parts by mass, more preferably of the order of 1 part to about 30 parts by mass, further preferably of the order of 5 parts by mass to 20 parts by mass, on the basis of 100 parts by mass of the entire component (c).

In addition, in the component (c), the monomers that undergo copolymerization with the monomer having a perfluoroalkyl group of not more than 6 carbon atoms may further comprise a third monomer component (c3) copolymerizable therewith, other than the monomer containing a cationic donor group, the monomer containing an anionic donor group, and the monomer containing an oxyalkylene group.

The third monomer component (c3) that undergoes copolymerization with the monomer having a perfluoroalkyl group of not more than 6 carbon atoms is not particularly limited, and includes, for example, ethylene, vinyl acetate, halogenated vinyls (for example, vinyl chloride), halogenated vinylidenes (for example, vinylidene chloride), acrylonitrile, styrene, benzyl (meth)acrylate, stearyl (meth)acrylate, behenyl (meth)acrylate, cyclohexyl (meth)acrylate, t-butylcyclohexyl (meth)acrylate, isobornyl (meth)acrylate, dicyclopentanyl (meth)acrylate, dicyclopentenyl (meth) acrylate, dicyclopentanyloxyethyl (meth)acrylate, tricyclopentanyl (meth)acrylate, adamantyl (meth)acrylate, 2-methyl-2-adamantyl (meth)acrylate, 2-ethyl-2-adamantyl (meth)acrylate, methyl (meth)acrylate, ethyl (meth)acrylate, isopropyl (meth)acrylate, t-butyl (meth)acrylate, lauryl (meth)acrylate, myristyl (meth)acrylate, cetyl (meth)acrylate, glycerol mono(meth)acrylate, tetrahydrofurfuryl (meth)acrylate, 3-chloro-2-hydroxypropyl (meth)acrylate, N-vinyl-2-pyrrolidone, N-vinyl-3-methyl-2-pyrrolidone, N-vinyl-4-methyl-2-pyrrolidone, N-vinyl-5-methyl-2-pyrrolidone, N-vinyl-3,3-dimethyl-2-pyrrolidone, vinyl alkyl ketones, vinyl alkyl ethers, isoprene, chloroprene, butadiene, and others. When copolymerized into the component (c), the third monomer component (c3) copolymerized may comprise a monomer of one type, or monomers of two or more types.

In the component when the copolymer comprises the third monomer as an additional constituent unit, the proportion of the moiety that is comprised of the third monomer component (c3) is not particularly limited, and for example, is preferably of the order of 0 parts to 25 parts by mass, more preferably of the order of 0.1 parts to 15 parts by mass, relative to 100 parts by mass of the total proportion of the moiety that is comprised of the monomer having a perfluoroalkyl group of not more than 6 carbon atoms and the moiety that is comprised of the (second) monomer containing a cationic donor group, an anionic donor group, or an oxyalkylene group.

The mass average molecular weight of the component is not particularly limited, and for example, is of the order of 2000 to 5000000, preferably of the order of 3000 to 5000000, further preferably of the order of 10000 to 1000000. Here, the mass average molecular weight of the component (c) is determined (in terms of polystyrene by GPC (gel permeation chromatography).

The component (c) can be produced by ordinary polymerization methods such as solution polymerization, emulsion polymerization, etc. Conditions can be freely selected for polymerization reactions for the preparation of the component (c). The polymerization can be carried out by using at least one initiator, for example, in a proportion of 0.1% to 2.0% by mass relative to the total mass of the monomers. As the initiator, use can be of known initiators, for example, peroxides such as benzoyl peroxide, lauroyl peroxide, succinyl peroxide, and tert-butyl perpivalate; and azo compounds such as 2,2-azobisisobutyronitrile, 4,4-azobis(4-cyanopentanoic acid), and azodicarbonamide. The polymerization can be carried out in a temperature range from 40° C. to the boiling point of the reaction mixture. The polymerization is preferably carried out in a temperature range of 60° C. to 90° C.

Solution polymerizations can be carried out in an organic solvent. Such an organic solvent is inert to and dissolves the monomers, and includes, for example, acetone, chloroform, HCHC225, N,N-dimethylformamide, isopropyl alcohol, pentane, hexane, heptane, octane, cyclohexane, benzene, toluene, xylene, petroleum ether, tetrahydrofuran, 1,4-dioxane, methyl ethyl ketone, methyl isobutyl ketone, ethyl acetate, butyl acetate, 1,1,2,2-tetrachloroethane, 1,1,1-trichloroethane, trichloroethylene, perchloroethylene, tetrachlorodifluoroethane, trichlorotrifluoroethane, and hydrofluoroethers. The organic solvent can be used, for example, in a range of the order of 50 parts to 2000 parts by mass, preferably 50 parts to 1000 parts by mass, relative to 100 parts by mass of the total of the monomers.

Emulsion polymerizations, on the other hand, can be carried out in an aqueous medium. As used herein, an aqueous medium means a liquid containing water and having a content of a volatile organic solvent of not more than 1% by mass. Specifically, water, or an azeotropic mixture containing water is preferable. A volatile organic solvent, as used herein, means an organic solvent, such as alcohols, that volatilizes at room temperature, specifically an organic solvent having a boiling point at $1 \times 10^5$ Pa (hereinafter simply referred to as a "boiling point") of 100° C. or less. Here, solvents that form an azeotropic mixture with water are not included in such a volatile organic solvent.

The component (c) can be self-emulsified to form an emulsion (in particular, an aqueous emulsion) even in the absence of an emulsifier, or dissolved in water to form an aqueous solution. The emulsion may optionally contain an emulsifier, but if anything, preferably does not. When the emulsion contains an emulsifier, the amount of the emulsifier is, for example, of the order of 0.01 to 40 parts by mass, particularly of the order of 0.1 to 20 parts by mass, relative to 100 parts by mass of the component (c).

The component c) functions as an agent for water and oil repellency. As the component (c), commercially available products can also be used. For example, aqueous dispersions of a component (c) are readily available, and such aqueous dispersions may be used as the component (c) for forming a coating film of the present invention. Note that the amount of the component (c) to be mixed in this case is calculated based on the content of the copolymer in the aqueous dispersion.

The content of the component (c) in the coating film is not particularly limited, and is preferably of the order of 3% to 60% by mass, more preferably of the order of 4% to 55% by mass, in terms of the mass of the copolymer, from the viewpoint of exhibiting excellent water and oil repellency.

A coating film of the present invention may have a single layer structure in which (a) calcium carbonate having an average particle diameter of 600 nm to 9000 nm, (b) a polyvinyl alcohol, and (c) a copolymer comprising, as a constituent, a monomer having a perfluoroalkyl group of not more than 6 carbon atoms are uniformly dispersed. Alternatively, a coating film of the present invention may have a multilayer structure comprising a first layer comprising (a) calcium carbonate having an average particle diameter of 600 nm to 9000 nm, as described above, and (b) a polyvinyl alcohol, as described above, and a second layer comprising (c) a copolymer comprising, as a constituent unit, a monomer having a perfluoroalkyl group of not more than 6 carbon atoms, as described above. Here, when the coating film has a multilayer structure, the first layer is located on the surface of an article and the second layer forms the outermost surface, as is usual with the case.

It is noted that the first layer, which does not comprise the component (c), may be formed of the components (a) and (b), but may further comprise the component (c). It is also noted that the second layer, which does not comprise the component (a) or the component (b), may be formed of the component (c) alone, but may further comprise at least one of the components (a) and (b).

The amount at which a coating film of the present invention is to be applied is not particularly limited, and is preferably of the order of 1 g/m² to 50 g/m², more preferably of the order of 3 g/m² to 20 g/m². When the coating film has a multilayer structure, the amount of the first layer to be applied is not particularly limited, and is preferably of the order of 0.9 g/m² to 45 g/m², more preferably of the order of 2.7 g/m² to 18 g/m²; and the amount of the second layer to be applied is not particularly limited, and is preferably of the order of 0.1 g/m² to 5 g/m², more preferably of the order of 0.3 g/m² to 2 g/m².

2. Compositions for Coating Film

A composition for coating film of the present invention is characterized in that it comprises (a) calcium carbonate having an average particle diameter of 600 nm to 9000 nm, (b) a polyvinyl alcohol, and (c) a copolymer comprising, as a constituent unit, a monomer having a perfluoroalkyl group of not more than 6 carbon atoms. The composition for coating film of the present invention is applied to the surface of an object (article) to be coated, followed by drying, thereby to form the coating film of the present invention detailed in the above-described section under "1. Coating films."

The type, content, and others of the components (a), (b), and (c) in a composition for coating film of the present invention are the same as in the coating film of the present invention detailed in the above-described section under "1. Coating films." Further, a composition for coating film of the present invention preferable comprises a dispersing medium. The content of a dispersing medium in the composition for coating film is not particularly limited, and is preferably of the order of 45% to 90% by mass, more preferably of the order of 65% to 85% by mass. It is noted that when the component (c) is used in the form of a dispersion, this amount also includes the amount of the dispersing medium contained in the dispersion.

The dispersing medium is not particularly limited, and preferably is water, ethanol, isopropyl alcohol, or the like, with water being particularly preferable. The composition for coating of the present invention preferably is an aqueous dispersion of the components (a), (b), and (c). As mentioned above, the component (c) can employ, for example, commercially available aqueous dispersions which are readily available, and a composition for coating film of the present invention can be prepared by mixing such an aqueous dispersion and the components (a) and (b). It is noted that the amount of the component (c) to be mixed in this case is calculated, based on the content of the copolymer in the aqueous dispersion.

A specific example of a composition for coating film of the present invention is an aqueous dispersion comprising the component (a) in an amount of the order of 5% to 30% by mass, more preferably of the order of 10% to 20% by mass, pa preferably of the order of 10% to 15% by mass; the component (b) in an amount of the order of 0.1% to 15% by mass, more preferably of the order of 2% to 15% by mass, particularly preferably of the order of 3% to 10% by mass; and the component (c) in an amount of the order of 0.2% to 20% by mass, more preferably of the order of 1% to 20% by mass, further preferably of the order of 1% to 7% by mass, particularly preferably of the order of 2% to 6% by mass. The proportion of water that is a dispersing medium in the aqueous dispersion is not particularly limited, and is preferably of the order of 45% to 90% by mass, more preferably of the order of 65% to 85% by mass.

The amount at which the composition for coating film of the present invention is to be applied to an object (article) to be coated is not particularly limited, and can be set to be such that the above-described amount of the coating film applied is obtained after drying. Details of methods for forming a coating film using the composition for coating film of the present invention is as described below.

3. Film-Forming Agents

A film-forming agent of the present invention is characterized in that it comprises a first agent comprising (a) calcium carbonate having an average particle diameter of 600 nm to 9000 nm and (b) a polyvinyl alcohol, and a second agent comprising (c) a copolymer comprising, as a constituent unit, a monomer having a perfluoroalkyl group of not more than 6 carbon atoms. The type, content, and others of the components (a), (b), and (c) in the film-forming agent of the present invention are the same as in the coating film of the present invention detailed in the above-described section under "1. Coating films."

The film-forming agent of the present invention is a two-part coating-film-forming agent that comprises a first agent comprising the components (a) and (b), and a second agent comprising the component (c). A coating film having a multilayer structure detailed in the above-described section under "1. Coating films" can be suitably formed by using the film-forming agent of the present invention, for example, by applying the first agent onto the surface of an object (article), followed by drying to form a first layer, and then applying the second agent onto the first layer, followed by drying to form a second layer. It is also possible to form a coating film having a single layer structure in which the above-described components (a), (b), and (c) are uniformly dispersed, by using the film-forming agent of the present invention and uniformly mixing the first agent and the second agent when it is required.

The content of the component (a) in the first agent is preferably of the order of 5% to 30% by mass, more preferably of the order of 10% to 20% by mass, particularly preferably of the order of 10% to 15% by mass. The content of the component (b) in the first agent is preferably of the order of 0.1% to 15% by mass, more preferably 2% to 15% by mass, particularly preferably of the order of 3% to 10% by mass. The content of the component (c) in the second agent is preferably of the order of 0.2% to 20% by mass, more preferably of the order of 1% to 20% by mass, further preferably of the order of 1% to 7% by mass, particularly preferably of the order of 2% to 6% by mass. The second agent in the film-forming agent may employ an aqueous dispersion comprising the component (c). The content of the component (c) in the aqueous dispersion comprising the component (c) is not particularly limited, and is preferably 10% to 30% by mass. As the aqueous dispersion, commercially available products as described above are readily available, for example. Of course, the amount of the component (c) to be mixed in this case is calculated based on the content of the copolymer in the aqueous dispersion.

In the film-forming agent of the present invention, the first agent and the second agent may each comprise a dispersing medium. The dispersing medium is not particularly limited, and by way of example, can be the same as the dispersing mediums exemplified in the above-described section under "2. Compositions for coating film." The content of a dispersing medium in the first agent is not particularly limited, and is preferably of the order of 45% to 90% by mass, more preferably of the order of 65% to 85% by mass. Also, the content of a dispersing medium in the second agent is not particularly limited, and is preferably of the order of 45% to 90% by mass, more preferably of the order of 65% to 85% by mass.

The amount at which the film-forming agent of the present invention is to be applied to an object (article) to be coated is not particularly limited, and can be set to be such that the above-described amount of the coating film applied (each of the first layer and the second layers when it has a multilayer is obtained after drying. Details of methods for forming a coating film using the film-forming agent of the present invention is as described below.

4. Articles Having Coating Films

An article having a coating film of the present invention is obtained by applying an above-described composition for coating film or agent of the present invention onto a surface of an article that is an object to be coated. That is, an article having a coating film of the present invention is an article that is an object to be coated, on at least a portion of the surface of which the coating film of the present invention detailed in the above-described section under "1. Coating films" is formed.

An article that is an object to be coated is not particularly limited, and preferably includes articles, at least a portion of a surface (at least one of the outer surface and the inner surface) of which is formed of paper, plastic, glass, metal, or the like. Among these articles, preference is given to articles made of paper, mainly of paperboard, such as base paper for corrugated board, paperboard for paper containers, and base paper for building materials, because a coating film of the present invention is relatively firmly fixed on their surface. Applications of articles include, for example, packaging materials. For example, in cases of paper containers having a coating film of the present invention on the inner surface thereof, the content is difficult to adhere to the inner surface of the container, and can be suitably discharged from the container.

5. Methods for Forming Coating Films

Methods for forming the coating film of the present invention on a surface of an object (article) to be coated include, for example, a method comprising a step of applying a composition for coating film of the present invention onto a surface of an object to be coated, followed by drying.

The amount at which the composition for coating film of the present invention is to be applied onto an object to be coated is not particularly limited, and can be set to be such that the above-described amount of the coating film applied is obtained after drying. The drying temperature is not particularly limited, as long as the dispersing medium contained in the composition for coating film evaporates, and is preferably of the order of 100° C. to 200° C. The drying time is not particularly limited, and preferably of the order of 5 minutes to 30 minutes.

Also, methods for forming the coating film of the present invention on a surface of an object (article) to be coated include a method comprising, for example, a step 1 of applying, using a film-forming agent as described above, the first agent comprising the components (a) and (b) onto a surface of an object to be coated, followed by drying to form a first layer, and a step 2 of applying, onto the first layer, the second agent comprising the component (c), followed by drying to form a second layer. By this coating film-forming method, it is possible to suitably form a coating film having a multilayer structure comprising the first layer and the second layer as described above.

The amounts at which the first and the second agents are to be applied to an object (article) to be coated are not particularly limited, and can be set to be such that above-described amounts of the first and the second layers applied are obtained. The drying temperature for the first agent is not particularly limited, as long as it is a temperature at which the dispersing medium contained in the first agent evaporates, and is preferably of the order of 100° C. to 200° C. The drying time for the first agent is not particularly limited, and preferably of the order of 5 minutes to 30 minutes. Also, the drying temperature for the second agent is not particularly limited, as long as it is a temperature at which the dispersing medium contained in the second agent evaporates, but is preferably of the order of 100° C. to 200° C. The drying time for the second agent is not particularly limited, and preferably of the order of 5 minutes to 30 minutes.

EXAMPLES

Now, the present invention will be described in detail with reference to examples and comparative examples. However, the present invention is not limited to these examples.

Example 1

Coating films were formed as followed. Calcium carbonate shown in Table 1 was added to water and mixed for 1 minute in a water bath equipped with an ultrasonic transmitter. To the mixture were added an aqueous dispersion of an anionic copolymer comprising, as a constituent unit, a monomer having a perfluoroalkyl group [an aqueous dispersion of a copolymer consisting of 75 parts by mass of $F(CF_2)_6CH_2CH_2OCOC(CH_3)=CH_2$, 5 parts by mass of acrylic acid, and 20 parts by mass of 2-hydroxyethyl methacrylate (in an amount of 20 parts by mass)], and a polyvinyl alcohol (PVA) shown in Table 1, followed by mixing for 1 minute in a water bath equipped with an ultrasonic transmitter. The resulting mixture solution was applied onto a cardboard having a thickness of 0.4 mm, with a bar coater (No. 9, manufactured by Matsuo Sangyo Co., Ltd.), and heat dried in an oven at 180° C. for 10 minutes to form a coating film. The mixture solution had a composition of 15% by mass of calcium carbonate, 10% by mass of the aqueous dispersion (2% by mass in terms of the mass of the copolymer), 5.0% by mass of the polyvinyl alcohol, and 70.0% by mass of water, and the amount of the mixture solution applied was set to be such that the mass of the coating film after drying was 4.0 g/m². After drying, the cardboard was cooled to room temperature and held horizontally, and on this state, various liquid samples were each dropped in a volume of 0.04 ml in a circular area of about 0.8 cm² on the surface of the coating film. The cardboard was gradually inclined to determine the inclination angle (°) at which the liquid sample began to roll downward. The results are shown in Table 1 below.

The liquid samples used for the assessment of the formed coating films were: for salad oil, a salad oil manufactured under the trade name of "Nissin Salad Oil" by The Nisshin OilliO Group, Ltd. (a mixed oil of soybean oil and rapeseed oil); for yogurt, a yogurt manufactured under the trade name of "Meiji Bulgaria Yogurt" (with aloe) by Meiji Co., Ltd.; for tonkatsu sauce, a tonkatsu sauce manufactured under the trade name of "Sause Tonkatsu Jukusei" by Kagome Co., Ltd.; and for ketchup, a ketchup manufactured under the trade name of "Tomato Ketchup" by Kagome Co., Ltd.

TABLE 1

| | | Sample/inclination angle | | | | |
|---|---|---|---|---|---|---|
| | Calcium carbonate and PVA in coating film | Water | Salad oil | Yogurt | Tonkatsu sauce | Ketchup |
| (1) | Calcium carbonate (1) PVA (1) | 10° | 10° | 10° | 10° | 30° |
| (2) | Calcium carbonate (2) PVA (2) | 10° | 30° | 10° | 20° | 30° |
| (3) | Calcium carbonate (1) PVA (2) | 10° | 20° | 10° | 20° | 40° |
| (4) | Calcium carbonate (1) PVA (3) | 10° | 20° | 10° | 20° | 40° |

The calcium carbonates and PA/As shown in Table 1 are as follows.

Calcium carbonate (1): manufactured under the trade name of "Cal-lite KT" by Taiyo Chemical Industry Co., Ltd. and having an average particle diameter (D50) of 5800 nm (porous), a BET specific surface area of 35 to 40 m²/g, and a primary particle diameter of 200 nm (calculated from the BET specific surface area)

Calcium carbonate (2): manufactured under the trade name of "Cal-lite SA" by Taiyo Chemical Industry Co., Ltd. and having an average particle diameter (D50) of 5000 nm (porous), a BET specific surface area of 10 to 15 m²/g, and a primary particle diameter of 1000 nm (a value from the measurement of the major axis with an electron microscope).

PVA (1): a polyvinyl alcohol manufactured under the trade name of "RS-2117" by Kuraray Co., Ltd. and having a degree of saponification of 97.5 mol % and a degree of polymerization of 1700.

PVA (2): a polyvinyl alcohol manufactured under the trade name of "PVA-117H" by Kuraray Co., Ltd. and having a degree of saponification of 99.3 mol % and a degree of polymerization of 1700.

PVA (3): a polyvinyl alcohol manufactured under the trade name of "Z-100" by The Nippon Synthetic Chemical Industry Co., Ltd. and having a degree of saponification of 99.3 mol % and a degree of polymerization of 500.

As is apparent from the results shown in Table 1, it was found that each of the coating films (1) to (4) in Example 1, which were formed of the mixtures comprising (a) calcium carbonate having an average particle diameter of 600 nm to 9000 nm, (b) a polyvinyl alcohol, and (c) a copolymer comprising, as a constituent unit, a monomer having a perfluoroalkyl group having not more than 6 carbon atoms, resulted in the respective liquid samples rolling downward at small inclination angles and was very superior in water and oil repellency.

Comparative Example 1

In Comparative Example 1, coating films were formed in a similar way as in Example 1, except that inorganic particles described below were used instead of calcium carbonates (1) and (2). Next, as in Example 1, various liquid samples were each dropped in a volume of 0.04 ml in a circular area of about 0.8 cm² on the surface of the coating film. The cardboard was gradually inclined to determine the inclination angle (°) at which the liquid sample began to roll downward. The results obtained were as follows. In the case of using salad oil as a liquid sample, for all the coating films tested, the salad oil spread on the surface of the coating film, did not form a liquid drop, and gradually dropped along the surface of the coating film when the cardboard was vertically erected. From these results, it was confirmed that all of the coating films formed in Comparative Example 1 were inferior in water and oil repellency.

[Inorganic Particles]

Calcium carbonate (3): manufactured under the trade name of "Brilliant-1500" by Shiraishi Kogyo Kaisha, Ltd. and having an average particle diameter (D50) of 500 nm, a BET specific surface area of 10 to 14 m²/g, and a primary particle diameter of 150 nm (calculated from the BET specific surface area).

Calcium carbonate (4): manufactured under the trade name of "Poacal N" by Shiraishi Kogyo Kaisha, Ltd. and having an average particle diameter (D50) of 9500 nm (porous), a BET specific surface area of 10 to 18 m²/g, and a primary particle diameter of 80 nm (calculated from the BET specific surface area).

Hydrophilic fumed silica: manufactured under the trade name of "AEROSIL 200" by Nippon Aerosil Co., Ltd.

Hydrophobic fumed silica: manufactured under the trade name of "AEROSIL RX 300" by Nippon Aerosil Co., Ltd.

talc: manufactured under the trade name of "D-600" by Nippon Talc Co., Ltd. Low-temperature sintered ferrite powder: manufactured under the trade name of "JMG-1B" by JFE Chemical Corporation.

High-temperature sintered ferrite powder: manufactured under the trade name of "JMG-1A" by JFE Chemical Corporation.

Iron oxide (III) powder: obtained by air oxidation of an iron powder manufactured under the trade name of "RDL-300A" by Powdertech Co., Ltd., which was carried out by leaving it in air for 24 hours.

Comparative Example 2

Coating films were formed in a similar way as in Example 1, except that water-soluble polymers described below were used instead of PVAs (1) to (3). Next, as in Example 1, various liquid samples were each dropped in a volume of 0.04 ml in a circular area of about 0.8 cm² on the surface of the coating film. The cardboard was gradually inclined to determine the inclination angle (°) at which the liquid sample began to roll downward. The results obtained were as follows. In the cases when sodium polyacrylate or starch paste was used as a water-soluble polymer, the coating film was not sufficiently fixed on the cardboard, and peeled off when the surface thereof was rubbed with a finger. In addition, for the coating film in which an acrylic copolymer which is a water-resistant sizing agent for paper was used as a water-soluble polymer, the liquid samples other than water were not allowed to roll downward even when the cardboard was inclined vertically. Furthermore, for the coating film in which an acrylic, vinyl acetate-ethylene copolymer was used as a water-soluble polymer, none of the liquid samples was allowed to roll downward even when the card was inclined vertically.

Sodium polyacrylate: a reagent manufactured by Katayama Chemical Industries Co., Ltd.

Starch paste: manufactured under the trade name of "FC10" by Fuekinori Kogyo Co., Ltd.

Water-resistant sizing agent for paper: manufactured under the trade name of "BASOPLAST 400 DS" by BASF.

Acrylic, vinyl acetate-ethylene copolymer: manufactured under the trade name of "AV-650S" by Nichiei Kakoh Co., Ltd.

Example 2

Coating films were formed in a similar way as in Example 1, using mixtures having the compositions shown in Table 1 below. Next, as in Example 1, various liquid samples were each dropped in a volume of 0.04 ml in a circular area of about 0.8 cm² on the surface of the coating film. The cardboard was gradually inclined to determine the inclination angle (°) at which the liquid sample began to roll downward. Testing was carried out in the same manner as in Example 1, using coating liquids having similar compositions as in Example 1. The results obtained were as follows. The respective coating films resulting from the compositions (5) to (10) in Example 2 exhibited water- and oil-repellent effects with respect to all the liquid samples tested, similar as in Example 1.

TABLE 2

|  | Calcium carbonate (1) (% by mass) | PVA (1) (% by mass) | Anionic copolymer similar to that in example 1 (% by mass in terms of solid component) |
|---|---|---|---|
| (5) | 10 | 5 | 2 |
| (6) | 20 | 5 | 2 |
| (7) | 15 | 3 | 2 |
| (8) | 15 | 8 | 2 |
| (9) | 15 | 5 | 1 |
| (10) | 15 | 5 | 7 |

Example 3

Calcium carbonate (1) was added to water and mixed for 1 minute in a water bath equipped with an ultrasonic transmitter. To the resultant mixture was added PVA (1) and the mixture was mixed for 1 minute in a water bath equipped with an ultrasonic transmitter. Then, the resulting mixture solution was used as a first agent, applied onto a cardboard having a thickness of 0.4 mm, with a bar coater (No. 9, manufactured by Matsuo Sangyo Co., Ltd.), and heat dried in an oven at 180° C. for 10 minutes to form a first layer. The mixture solution had a composition of 15% by mass of calcium carbonate, 5.0% by mass of polyvinyl alcohol (PVA(1)), and 80.0% by mass of water, and the amount of the mixture solution applied was set to be such that the mass of the coating film after drying was 4.0 g/m$^2$. Then, an aqueous dispersion of an anionic copolymer comprising, as a constituent unit, a monomer having a perfluoroalkyl group (which was the same as that used in Example 1) was used as a second agent, applied onto the cardboad in the same volume as that of the first agent, and heat dried in an oven at 180° C. for 10 minutes to form a second layer. Next, as in Example 1, various liquid samples were each dropped in a volume of 0.04 ml in a circular area of about 0.8 cm$^2$ on the surface of the coating film. The cardboard was gradually inclined to determine the inclination angle (°) at which the liquid sample began to roll downward. The results obtained were as follows. The coating film in Example 3 exhibited water- and oil-repellent effects with respect to all the liquid samples tested, similar as in Example 1.

Example 4

Coating samples were prepared in a similar way as in Example 1, using the same components as in the composition (1) used in Example 1, except that the anionic copolymer comprising, as a constituent unit, the monomer having the perfluoroalkyl group was used in an amount of 18% by mass (as the mass of the copolymer) and the polyvinyl alcohol in an amount of 0.1% by mass. In addition, coating film samples were prepared in a similar way as in Example 1, except that in the composition (1) used in Example 1, the aqueous dispersion of the anionic copolymer was substituted by an aqueous dispersion of a cationic copolymer [an aqueous dispersion consisting of 75 parts by mass of F(CF$_2$)$_6$CH$_2$CH$_2$OCOC(CH$_3$)=CH$_2$, 10 parts by mass of diethylaminoethyl methacrylate, 10 parts by mass of 2-hydroxyethyl methacrylate, and 5 parts by mass of polyoxyethylene dimethacrylate (with the average degree of polymerization (n) of polyoxyethylene group being 3) (in an amount of 20% by mass)] or by an aqueous dispersion of a nonionic copolymer [an aqueous dispersion consisting of 65 parts by mass of F(CF$_2$)$_6$CH$_2$CH$_2$OCOC(CH$_3$)=CH$_2$, 20% by mass of ω-hydroxy-polyoxyethylene acrylate (with the average degree of polymerization (n) of polyoxyethylene group being 10), and 15 parts by mass of 2-hydroxyethyl acrylate (in an amount of 20% by mass)]. Although these coating film samples were somewhat inferior to those in Example 1, they also exhibited an almost comparable water- and oil-repellent effect.

The invention claimed is:

1. A coating film comprising:
    (a) calcium carbonate having an average particle diameter of 600 nm to 9000 nm;
    (b) a polyvinyl alcohol; and
    (c) a copolymer comprising, as a constituent unit, a monomer having a perfluoroalkyl group of not more than 6 carbon atoms.

2. The coating film according to claim 1, wherein a degree of saponification of (b) the polyvinyl alcohol is 97 mol % or more.

3. The coating film according to claim 1, wherein (a) the calcium carbonate having an average particle diameter of 600 nm to 9000 nm is at least one of porous calcium carbonate and aggregated calcium carbonate.

4. The coating film according to claim 1, comprising:
    a first layer comprising (a) the calcium carbonate having an average particle diameter of 600 to 9000 nm and (b) the polyvinyl alcohol; and
    a second layer comprising (c) the copolymer comprising, as a constituent unit, the monomer having the perfluoroalkyl group of not more than 6 carbon atoms.

5. A composition for coating film, comprising:
    (a) calcium carbonate having an average particle diameter of 600 to 9000 nm;
    (b) a polyvinyl alcohol; and
    (c) a copolymer comprising, as a constituent unit, a monomer having a perfluoroalkyl group of not more than 6 carbon atoms.

6. The composition for coating film according to claim 5, wherein a degree of saponification of (b) the polyvinyl alcohol is 97 mol % or more.

7. The composition for coating film according to claim 5, wherein (a) the calcium carbonate having an average particle diameter of 600 nm to 9000 nm is at least one of porous calcium carbonate and aggregated calcium carbonate.

8. The composition for coating film according to claim 5, wherein a content of (a) the calcium carbonate having an average particle diameter of 600 nm to 9000 nm is 5% to 30% by mass,
    a content of (b) the polyvinyl alcohol is 0.1% to 15% by mass, and
    a content of (c) the copolymer comprising, as a constituent unit, the monomer having the perfluoroalkyl group of not more than 6 carbon atoms is 0.2% to 20% by mass, and
    wherein the composition is an aqueous dispersion.

9. A film-forming agent comprising:
    a first agent comprising (a) calcium carbonate having an average particle diameter of 600 nm to 9000 nm, and (b) a polyvinyl alcohol; and
    a second agent comprising (c) a copolymer comprising, as a constituent unit, a monomer having a perfluoroalkyl group of not more than 6 carbon atoms.

10. An article having the coating film according to claim 1 on at least a portion of a surface of the article.

11. The article according to claim 10, wherein the surface is formed of paper, plastic, glass, or metal.

12. The article according to claim 10, wherein the article is a packaging material.

13. A paper container having the coating film according to claim 1 on an inner surface of the paper container.

14. A method for forming the coating film according to claim 4 on a surface of an article, the method comprising:
- a step 1 of applying, onto the surface of the article, a first agent comprising (a) the calcium carbonate having an average particle diameter of 600 to 9000 nm and (b) the polyvinyl alcohol, followed by drying to form a first layer; and
- a step 2 of applying, onto the first layer, a second agent comprising (c) the copolymer comprising, as a constituent unit, the monomer having the perfluoroalkyl group of not more than 6 carbon atoms, followed by drying to form a second layer.

15. A method of forming a coating film on a surface of an article, the method comprising a step of applying the composition for coating film according to claim 5 on the surface of the article, followed by drying.

* * * * *